United States Patent [19]

Dunbar et al.

[11] Patent Number: 5,280,465
[45] Date of Patent: Jan. 18, 1994

[54] FLUID DRIVE SYSTEM FOR A ROTATING MEDIUM

[75] Inventors: William M. Dunbar, Cottage Grove; Lynn R. Skow, North Branch, both of Minn.

[73] Assignee: Minnesota Mining and Manufacturing Company, St. Paul, Minn.

[21] Appl. No.: 914,766

[22] Filed: Jul. 15, 1992

[51] Int. Cl.$^5$ ............................................. G11B 23/00
[52] U.S. Cl. ..................... 369/266; 360/99.08
[58] Field of Search ............................. 369/266, 258; 360/99.08

[56] References Cited

U.S. PATENT DOCUMENTS

| | | | |
|---|---|---|---|
| 3,103,364 | 9/1963 | Macks et al. | 369/266 X |
| 3,134,527 | 5/1964 | Willis | 226/97 |
| 3,315,966 | 4/1967 | Allen | 369/266 |
| 3,384,378 | 5/1968 | Allen | 369/266 |
| 3,418,434 | 12/1968 | Groenewegen | 179/100.2 |
| 3,678,216 | 7/1972 | Rousso et al. | 179/100.2 |
| 3,934,883 | 1/1976 | Chambers | 360/99.08 |
| 3,943,275 | 3/1976 | Jebens et al. | 369/266 X |
| 3,992,576 | 11/1976 | Sugiura | 369/258 |
| 4,144,618 | 3/1979 | Campo et al. | 19/161.1 |
| 4,337,885 | 7/1982 | Stahler | 226/97 |
| 4,561,806 | 12/1985 | Leahart | 406/88 |
| 4,568,223 | 2/1986 | Leahart | 406/88 |
| 4,616,960 | 10/1986 | Gladish | 406/88 |
| 4,710,068 | 12/1987 | Lindstrom et al. | 406/88 |
| 4,732,513 | 3/1988 | Leahart | 406/88 |
| 4,828,434 | 5/1989 | Fairman et al. | 406/88 |

FOREIGN PATENT DOCUMENTS 2228365 12/1973 Fed. Rep. of Germany ...... 369/266

OTHER PUBLICATIONS

Non-Contact Drying and Turning-The "On Machine" Technology of the Nineties, Edward V. Bowden, pp. 41-46, paper presented at 44th Annual General Conference, Rotorua, 1990.
*Special Publication of the Society of Tribology & Lubricant Engineers*, vol. 7, Sep. 29, 1990, "Tribology & Mechanics of Magnetic Storage Media", pp. 1-8 & 49-54.

Primary Examiner—Edward K. Look
Assistant Examiner—Michael I. Kocharov
Attorney, Agent, or Firm—Gary L. Griswold; Walter N. Kirn; Charles D. Levine

[57] ABSTRACT

A drive system for rotating a disk includes a housing having a planar element with a working surface which includes a spindle which facilitates rotational movement of the disk relative to the drive assembly. A plurality of orifices extend through planar element at an acute angle relative to the working surface and are arranged in a circular array. A conduit assembly delivers fluid to the housing. The fluid exits through the orifices outlets to provide a motive force for rotating the disk around the spindle, while also providing a pressure differential to support the medium.

20 Claims, 3 Drawing Sheets

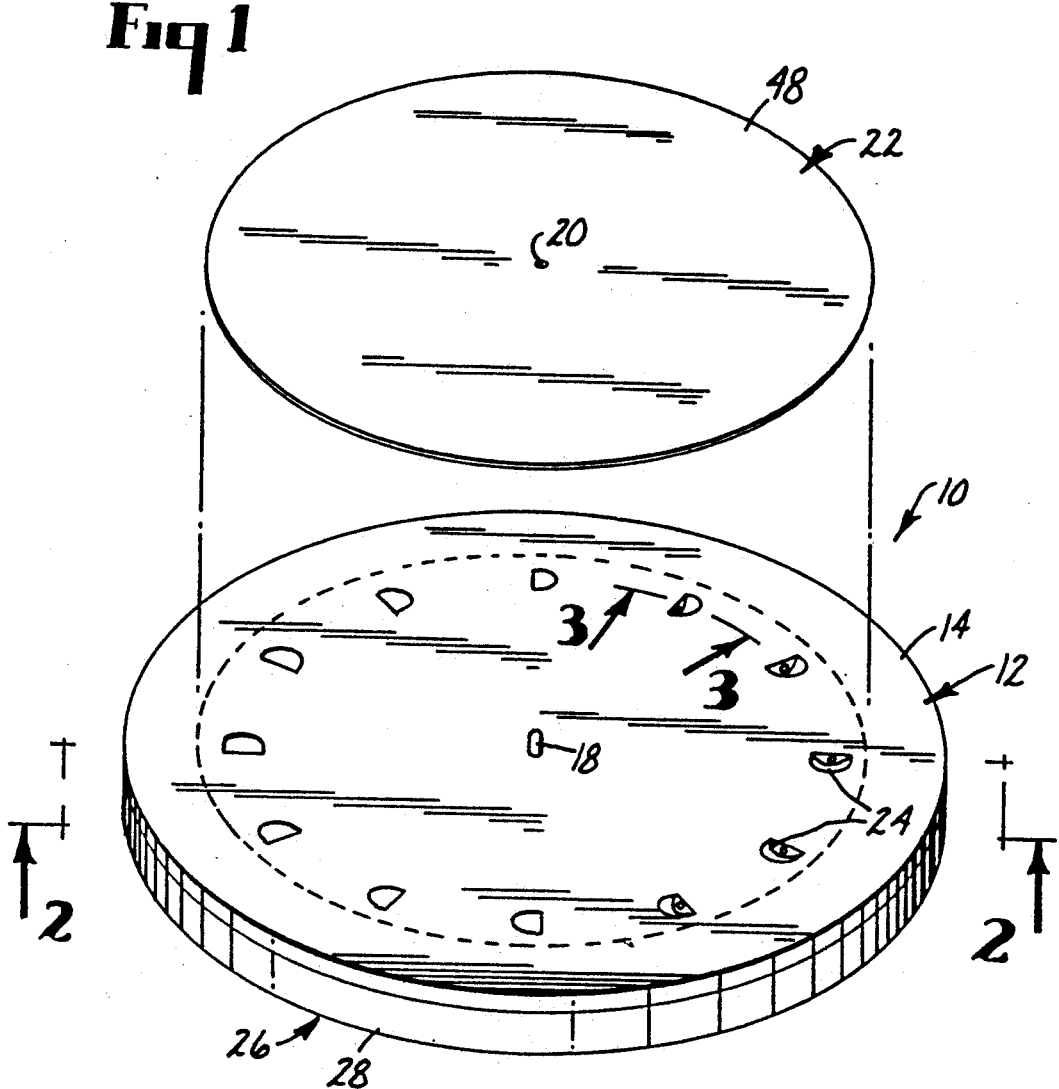
Fig. 1
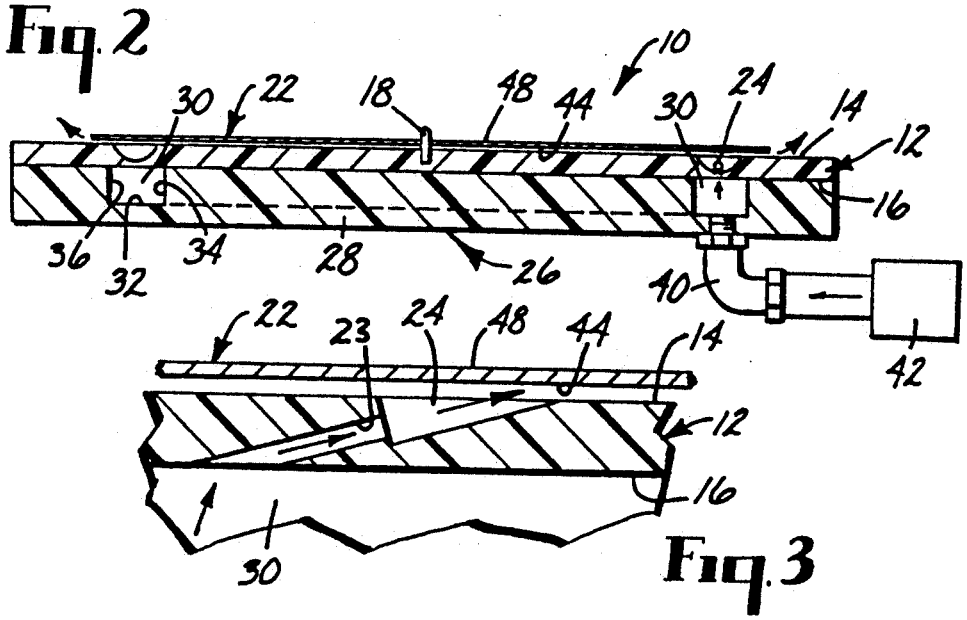
Fig. 2
Fig. 3

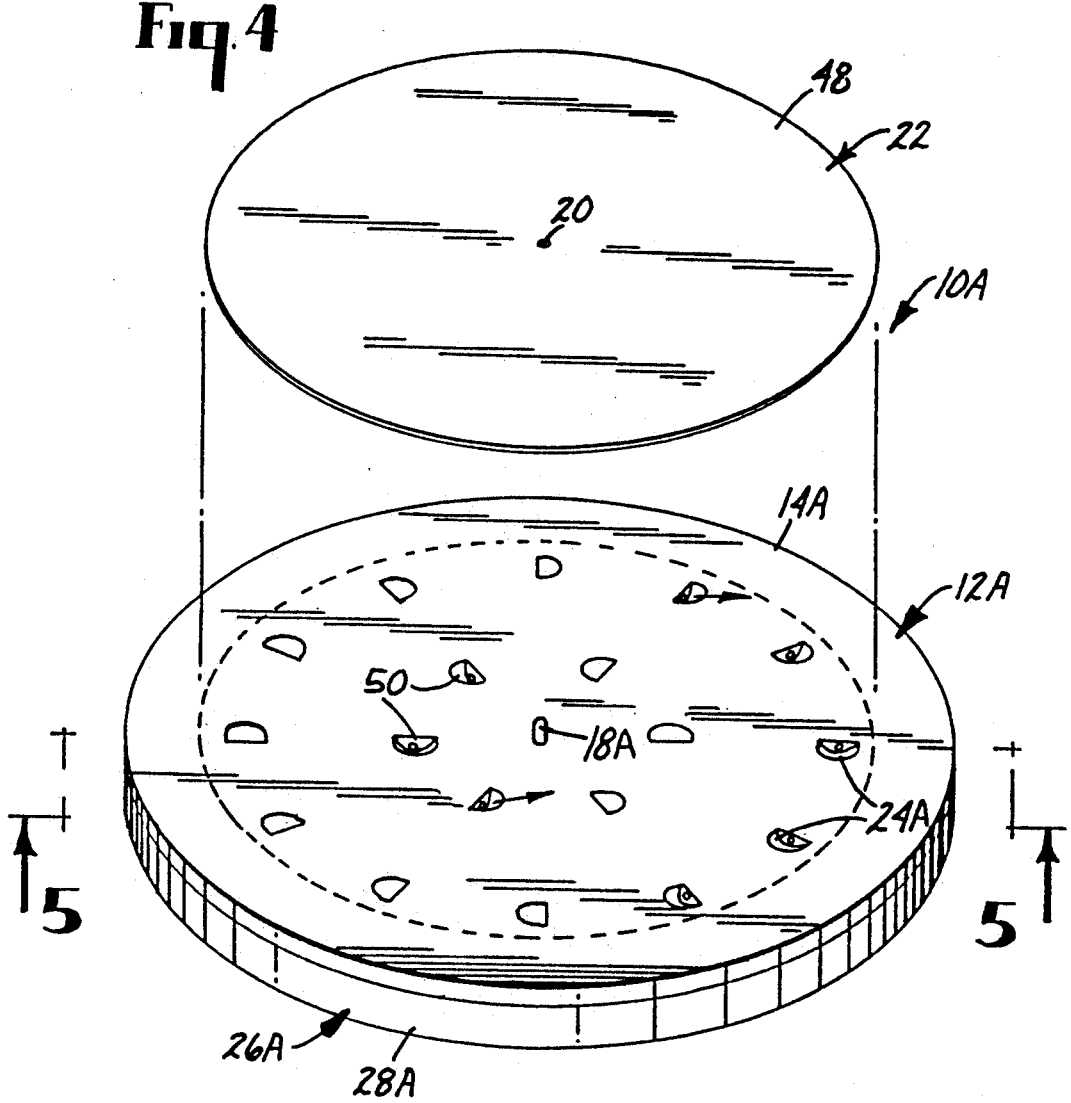
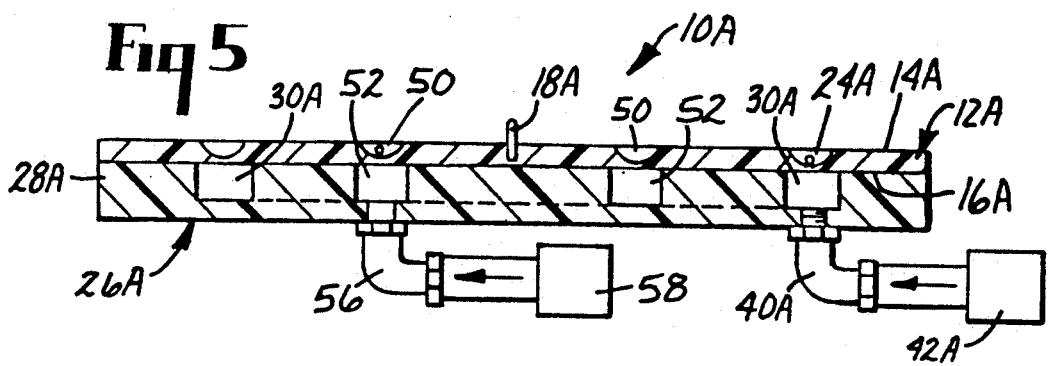

FLUID DRIVE SYSTEM FOR A ROTATING MEDIUM

TECHNICAL FIELD

The present invention relates to a drive system for storage media. More particularly, the present invention relates to a fluid drive system for a disk-like storage medium.

BACKGROUND OF THE INVENTION

Magnetic and optical disks are highly popular for storing large quantities of information, for example, with personal computers. Magnetic disks come in various formats including 8 inch, 5¼ inch and 3½ inch diameter. Disk drive systems retrieve information from and store information on the disks. These drive systems take on various forms depending upon the format of the disk. Both magnetic and optical disk drives use an electrical drive motor linked to a power supply via speed control circuitry. Also, the drive systems use some mechanical or physical device for coupling the storage medium to the drive motor to rotate the medium at a controlled velocity. The storage medium is rotated relative to a read/write head of the disk drive system. The read/write head retrieves information from and transfers information to the storage medium.

Known data storage systems use drives that rotate the medium by engagement of the drive with the medium. A metal hub is used for engagement with 3½ inch diskette designs, while a spindle is used to engage a central aperture with hubless 5¼ inch designs. Thinner medium allows head designs to have improved head-to-medium contact by increasing the wrap around the head. Also, a fixed hub or contact spindle stiffens the medium near the inner data tracks and results in poorer head-to-medium contact at these tracks. This limits the useful area of the medium and makes it difficult to produce very small diameter media. Also, at higher speeds, as is well-known, the fixed hub flexible medium generates a concave profile as it is pulled toward the drive base. This complicates head-to-medium contact. The radial tolerances with the large fixed hubs become more significant as the data storage products use higher track densities.

In the optical data storage product area a flat substrate is required and a thick caliper base must be used. A thinner caliper is preferred if it could be kept flat during use. The medium containers for magnetic and optical diskettes are relatively large and bulky due to housing one medium per container. For example, it takes a container that is 0.125 inch thick to store one diskette that is 0.003 inch thick. A system is needed that will be able to store hundreds of 0.003 inch thick media in one container for enhanced data storage.

SUMMARY OF THE INVENTION

The present invention is a data storage system for a disk storage medium which improves upon known mechanically-coupled data storage systems. The drive system allows the medium to be mounted on and rotate around a centering guide while being axially free and being held radially with close tolerances. A fluid rotates the medium and provides a pressure differential to support the medium without contact.

The drive system includes a planar element with a working surface configured to receive the storage medium. The centering guide on the working surface facilitates rotation of the storage medium relative to the planar element and includes a spindle which provides for centering via an aperture of the storage medium. The aperture of the medium is slightly larger than the spindle to allow the storage medium to move along the spindle axis. The storage medium can be a magnetic or optical data storage disk. A conduit assembly communicates with a fluid orifice which extends completely through the planar element. The conduit assembly, delivers a fluid under pressure through the orifice to the working surface of the planar element to provide a motive force which rotates the storage medium around the centering spindle. Depending on the magnitude of the pressure differential, and the tensile strength and thickness of the substrate, if the working surface is flat and the media is deformable, then the media will take the shape of the working surface and will also be flat.

The orifices terminate in outlets which are arranged in a circle around the working surface. The conduit assembly includes a housing mounted to an opposing surface of the planar element and having an interior region which defines a plenum chamber.

The fluid is supplied to the conduit assembly to rotatably support the storage medium. A read/write head for data transfer can be positioned in a recess in the planar element or adjacent to the top surface of the storage medium for data transfer.

In an alternative embodiment, both an outer circular array of orifices and an inner circular array of orifices extend through the planar element. The arrays deliver fluid at acute angles relative to the working surface and are in opposite directions to each other. Fluid delivered through the outer circular array provides the motive force to rotate the disk around the spindle. Fluid delivered through the inner circular array provides an opposing braking force that counteracts the motive force and assists in fine tuning the speed of rotation of the medium. Primary speed control is via fluid velocity control. This drive system will drive and support the medium directly and will not require bulky jackets. The medium can be stored in bulk containers that can store a large number of pieces due to the reduced bulk. As an example, the magnetic medium for the diskette product is 0.003 inch thick and a 0.5 inch thick container can store over one hundred media. The new diskette medium will hold about 25 Megabytes of information per unit so over 2,500 Megabytes of information storage is possible in a small container that can be held in a shirt pocket. There are many systems well known in the art for moving the medium into and out of containers, placing on the center pin and returning to the container such as the Jukebox systems, robotics systems, or air transport.

BRIEF DESCRIPTION OF THE DRAWINGS

FIG. 1 is a perspective view of a drive system of the present invention with a data storage disk spaced therefrom.

FIG. 2 is a sectional view of the drive system with the data storage disk spaced therefrom taken along line 2—2 of FIG. 1.

FIG. 3 is an enlarged sectional view taken along line 3—3 of FIG. 1 showing the fluid orifice.

FIG. 4 is a perspective view of an alternative embodiment of the drive system of the present invention with a data storage disk spaced therefrom.

FIG. 5 is a sectional view of the drive system with the data storage disk spaced therefrom taken along line 5—5 of FIG. 4.

DETAILED DESCRIPTION OF PREFERRED EMBODIMENTS

Figure 6:
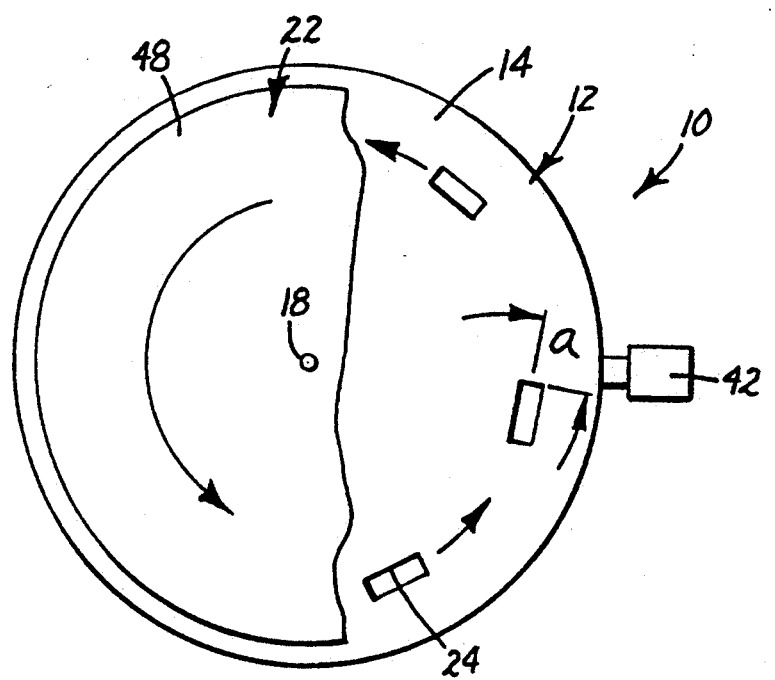
FIG. 6 is a top view of the drive system of FIG. 1 showing the fluid flow direction.

The drive system 10 can be used with information storage media, such as a magnetic or optical data storage disk which can be a jacketless CD-ROM disk storage medium of the type including a circular substrate upon which information can be stored and retrieved. Other magnetic or optical disk type media of any size stored in a jacket also can be driven.

The drive system 10 can use various fluids including air, water, inert fluorocarbons, and various other gases and gas mixtures, and includes a planar element 12, such as a top plate. The planar element 12 has a working surface 14 and an opposing surface 16. A centering guide, such as a spindle 18, is mounted on the planar element 12 at the center of the working surface 14. The spindle 18 provides for centering via a center aperture 20 of an information storage medium, such as a magnetic disk 22, and prevents the disk from translating off the working surface. Alternatively, other devices for centering and maintaining the position of the disk 22 can be used.

A plurality of orifices 23 extend through the planar element 12. The orifices 23 terminate in outlets 24 which are arranged in a circle around the working surface 14. Each outlet 24 creates a fluid path at the planar element 12 at an acute angle relative to the working surface 14 as shown in FIG. 3. A conduit assembly 26 includes a housing 28 mounted to the opposing surface 16 of the planar element 12. The housing 28 includes an annular channel which defines a plenum chamber 30 and has a bottom wall 32, inner and outer annular side walls 34, 36, and a top wall formed by the opposing surface 16 of the planar element 12. The housing 28 can be made of a number of layers to create the annular channel thereby offering economics of manufacture.

As shown in FIG. 2, an inlet 40 of the conduit assembly 26 extends into the housing 28 and introduces air to the plenum chamber 30 for distribution through the orifices 23. The inlet 40 is coupled to a compressed fluid supply 42 which supplies fluid such as air under pressure. The pressurized fluid within the plenum chamber 30 exits through the outlets 24 tangent to the circular array to deliver a jet-like flow of fluid to a lower surface of the disk 22 to provide a motive force to rotate the disk 22 around the spindle 18.

The fluid passing through the orifices 23 and exiting through the outlets 24, rotates the disk 22 above the working surface 14. The disk 22 velocity can be altered by changing the angle a, shown in FIG. 6, at which the fluid exits the outlets 24. As angle a decreases, the velocity of the disk 22 decreases. The directional component of the fluid flow contributes to both the pressure differential and the transport of the disk 22.

According to the Bernoulli principle, as a fluid velocity increases, its pressure is reduced from that of the surrounding fluid moving at a lower velocity. The velocity difference causes a pressure difference. An object placed between the high and low velocity fluid will tend to be forced toward the higher velocity fluid until equilibrium is reached. Where a uniform fluid flow is forced between a stationary plate and a movable object, a uniform force will be exerted on the object toward the plate. The object will not contact the plate if the object has an area-to-weight ratio large enough so that the force from the fluid jets exceeds the gravitational and other attractions.

A read/write head (not shown) for retrieving information from and recording information to the bottom surface 44 of the disk 22 can be recessed into the working surface 14 adjacent the fixed gap and can be positioned adjacent to the top surface 48 of the disk 22. A section of the planar element 12 can also be made into a slide with an attached read/write head that can transfer data to the bottom surface 44 of the disk 22.

An unexpected result of this system is the flatness of the disk 22 over the complete area when fluid jets are located on the perimeter of the disk 22. The flatness results from uniform pressure differential across the thickness of the disk. The thinner caliper media that can be used with the perimeter air drive is advantageous because stiffness is a cube function of caliper and the increased flexibility of the disk 22 results in better magnetic head wrap for improved data transfer.

As long as the average fluid flow is uniform between the disk 22 and the working surface 14 and the disk 22 has a sufficiently large area-to-weight ratio, a uniform pressure will be exerted on the article toward the working surface. Therefore, the system 10 can operate in any orientation. It can operate when the planar element 12 and the disk 22 are horizontal. With the disk 22 on the working surface 14 of the planar element 12, as well as vertical, with the disk 22 underneath the working surface 14 of the planar element 12, or at any orientation along the 360° circle of positions. The system 10 is orientation independent which can be advantageous for portable systems.

An alternative drive system 10A is shown in FIGS. 4 and 5. The drive system 10A includes a planar element 12A having a working surface 14A and an opposing surface 16A. A spindle 18A is mounted on the planar element 12A at the center of the working surface 14A and is adapted to provide for centering of the recording medium via a center aperture 20 of a disk 22.

The planar element includes an outer circular array of outlets 24A and an inner circular array of outlets 50. Both arrays of outlets 24A, 50 create a fluid path at the planar element 12A at an acute angle relative to the working surface 14A. The inner array 50 are directed opposite to the outer array 24A.

A conduit assembly 26A in fluid communication the outer and inner arrays of orifices and outlets 24A and 50 includes a housing 28A mounted to the opposing surface 16 of the planar element 12A. The housing 28A includes a first annular channel that defines a first plenum chamber 30A positioned beneath the outer circle of orifices and outlets 24A. A second annular channel of the housing 28A defines a second plenum chamber 52 positioned beneath the inner circle of orifices and outlets 50.

As shown in FIG. 5, first and second inlets 40A, 56 extend through the housing 28A into the respective first and second plenum chambers 30A, 52. The first and second inlets 40A, 56 are coupled to a compressed fluid supply such as a gas bottle, blower, fan, or compressor 58 which supplies fluid, such as air under pressure, to the plenum chambers 30A, 52. Fluid delivered to the first plenum chamber 30A exits through the outer array of outlets 24A and provides a motive force to rotate the disk 22 around the spindle 18A. Fluid delivered to the second plenum chamber 52 exits through the inner array of outlets 50 and provides a braking force that counteracts the motive force and assists in controlling the speed of rotation of the disk 22. This fluid can also provide support and control between the disk 22 and the working surface 14A. Alternatively, the rotating and braking roles of the arrays of outlets can be reversed.

The combination of the forward and reverse jets allows a higher velocity of the transport fluid for a given disk rotational speed. This allows the pressure differential to be controlled for a given rotational speed. This drive system is relatively uncomplicated and allows a storage medium to be rotated at high speeds to yield high data transfer rates.

No large center hub is required because the medium does not have to be clamped to the drive mechanism. This reduces manufacturing costs. Removing the fixed hub and permitting the center of the medium to move up and down on the spindle allows the medium to be used closer to the center than is possible with a hubbed disk. The width of the recording radius could be increased to over 1.0 inch with a 3 inch medium as compared with only 0.6 inches with a standard 3½ inch diskette. This system also allows high rotational velocities—over 20,000 rpm for a 0.003 in thick, 3½ inch diameter diskette. Due to the relatively small mass of a magnetic disk, a disk velocity change closely follows a fluid velocity change. Moreover, since this drive system has few moving parts, partial or complete system failure is less likely, and computer down time is reduced.

With no centering hub to restrict the flex in the medium near the inner tracks, better head-to-medium contact is possible. Revolving around a center pin will allow a very small medium, in the ½ inch diameter range, to be used for special applications. The track spatial radius tolerance will improve by providing a central hole as opposed to attaching a separate hub. Additionally, the tighter tolerances will allow better track stability than known products. The caliper of the medium in today's 3½ inch design is in the 0.0025-0.003 inch range. The thicker caliper is required due to driving the medium from the center instead of the edge with one embodiment of the fluid jet system of the present invention. The fluid drive will flatten out material as flexible as a non-woven fabric and will also rotate sub-1 mil film in a flat plane. The thinner caliper film that can be used with the fluid drive improves the head-to-medium contact by increasing the wrap. The greater head wrap increases the signal to noise ratio for a given magnetic bit size.

When a jacketed disk is driven, the jacket contains outlets 24 such that the jacket becomes the working surface 14 of the drive system 10. Therefore, the jacket becomes an integral part of the drive system. As there is no mechanical drive used with this system, the hub and drive masses are eliminated.

The thermal and hygroscopic expansion coefficients of the hub and medium in current 3½ inch magnetic diskette are different and can cause distortion as thermal or hygroscopic expansion sets in. Eliminating the metal hub will eliminate this possibility.

The fluid drive can remove dust and other debris from the medium and will supply a positive pressure to stop any contaminants from entering the drive during operation. This drive system can accommodate magnetic and optical diskettes having differing sizes and is very efficient for use with rotating disks for data storage and retrieval as well as other operations.

An example of a magnetic data storage system uses an air drive with ten 30/1000 inch orifices and outlets set at about 30 degrees to the horizontal, in a 3½ inch diameter and tangential to the 3½ inch circular drive fitted with a center pin and a 300 oersted medium punched with a 3½ inch outer diameter and an inner diameter a few 10/1000 inch greater than the diameter of the spindle 18. A ⅛ inch diameter hole is punched in the medium and a light-emitting diode (LED) or the like is placed to transmit light through the medium where it is detected by a light-sensing device and an amplified signal from same is used to determine the rotational speed. A ¼ inch slot is made in the base of the drive and a magnetic transducer head is fitted into the slot. The head is adjustable in the direction toward and away from the medium. The disk was rotated at 2000, 4000 and 6000 RPM and a good signal was written and read at each speed. This demonstrates that a signal can be written and read at very high speeds with this data storage system.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, the rotary drive system can be used to rotate media other than data storage media such as burnishing wheels and other abrasive and cleaning devices. Also, a single conduit assembly can be used to operate a plurality of disk drives.

We claim:

1. A drive assembly for rotating a medium that is separate from the drive assembly comprising:
    a planar element having a working surface for receiving the medium and an opposing surface;
    means for centering the medium with a major surface facing the working surface; and
    at least one orifice extending through the planar element between the opposing surface and the working surface and terminating in an outlet on the working surface for delivering fluid through the planar element to the working surface, wherein fluid is delivered through the orifice and out of the outlet at an angle relative to the working surface to provide a motive force and pressure differential for rotating and supporting the medium adjacent the working surface without contacting the working surface.

2. The drive assembly of claim 1 comprising a plurality of orifices which extend through the planar element and terminate in outlets which are arranged in a first circular array around the working surface.

3. The drive assembly of claim 2 wherein each outlet is oriented to deliver fluid at an acute angle relative to the working surface.

4. The drive assembly of claim 2 further comprising:
    a plurality of orifices which extend through the planar element and terminate in outlets which are arranged in a second, inner circular array around the working surface, the second array being concentric with the first array.

5. The drive assembly of claim 4 wherein:

each outlet on the first array of outlets is oriented to deliver fluid at an acute angle relative to the working surface of the planar element to provide one of a motive force and a braking force; and each outlet on the second circular array of outlets is oriented to deliver fluid in a direction opposite to that of the first circular array of outlets to the working surface of the planar element to provide the other of the motive force and the braking force.

6. The drive assembly of claim 5 wherein the first circular array of outlets provides the motive force for rotating the medium and the second circular array of outlets provides a braking force that counteracts the motive force and controls the rotation of the medium.

7. The drive assembly of claim 6 wherein the fluid exiting the first and second circular arrays of outlets provides for a uniform pressure differential to flatten the medium.

8. The drive assembly of claim 6 wherein the conduit assembly includes a first conduit assembly for the first circular array of outlets and a second conduit assembly for the second circular array of outlets.

9. The drive assembly of claim 1 further comprising a conduit assembly in fluid communication with the planar element for delivering a fluid to the planar element, wherein the conduit assembly includes a housing mounted to the opposing surface of the planar element and having an interior region defining a plenum chamber.

10. The drive assembly of claim 1 wherein the centering means comprises a centering guide located on the working surface of the planar element and including a spindle mounted to the center of the planar element wherein the medium is rotated around the centering guide.

11. The drive assembly of claim 10 wherein the medium is a disk having an aperture for releasably mounting the disk on the spindle.

12. A drive assembly of claim 1 further comprising a compressed fluid supply to supply the fluid to the conduit assembly.

13. The drive assembly of claim 1 wherein fluid delivered through the orifice and out of the outlet to the working surface impinges upon a major surface of the medium.

14. A drive system for use with a disk storage medium of the type including a circular substrate member and recording layer upon which information can be stored and retrieved, including:
a circular top plate having a working surface for receipt of the disks storage medium;
means for centering the disk storage medium comprising a centering guide centrally mounted on the working surface of the top plate for cooperating with an aperture of the disk storage medium;
at least one orifice extending through the circular top plate and terminating in an outlet on the working surface; and
a conduit assembly in fluid communication with the orifice and the outlet for delivering a jet-like flow of fluid to a lower surface of the disk storage medium to rotate and support the disk storage medium.

15. The drive system of claim 14 further comprising a read/write head located adjacent the working surface of the circular top plate, and wherein the jet-like flow of fluid reduces the pressure beneath the disk storage medium relative to the pressure above the disk storage medium to force the disk storage medium toward the working surface of the top plate and into engagement with the read/write head.

16. The drive system of claim 14 wherein the conduit assembly comprises a housing mounted to a bottom surface of the circular top plate and comprising an interior region defining a plenum chamber, a circular bottom plate, inner and outer annular walls disposed between the top plate and the bottom plate, and an inlet for introducing fluid to the plenum chamber for distribution through the outlet.

17. The drive system of claim 14 further comprising a plurality of outlets arranged in a circular array around and oriented to deliver fluid at an acute angle relative to the working surface of the top plate, the jet-like flow of fluid exiting the outlets tangent to the circle.

18. The drive system of claim 14 wherein the disk storage medium is a jacketless disk storage medium.

19. The drive system of claim 14 wherein the centering means comprises a centering guide located on the working surface of the top plate for cooperating with an aperture of the disk storage medium and including a spindle mounted to the center of the planar element wherein the storage medium is rotated around the centering guide, wherein the disk storage medium rotates around the centering guide.

20. A method for rotating a medium that has a major surface comprising:
placing the medium adjacent a working surface, wherein the medium is separate from the working surface;
centering the medium with the major surface facing the working surface; and
delivering fluid from the working surface to the major surface of the medium to provide a motive force and supporting force for rotating the supporting the medium adjacent the working surface without contacting the working surface.

* * * * *

UNITED STATES PATENT AND TRADEMARK OFFICE
CERTIFICATE OF CORRECTION

PATENT NO. : 5,280,465
DATED : January 18, 1994
INVENTOR(S) : William M. Dunbar and Lynn R. Skow It is certified that error appears in the above-identified patent and that said Letters Patent is hereby corrected as shown below:

Col. 8, Line 51, "the" should read --and--.

Signed and Sealed this

Thirtieth Day of August, 1994

Attest:

BRUCE LEHMAN

*Attesting Officer*     *Commissioner of Patents and Trademarks*